United States Patent [19]

Nelson

[11] 4,174,704
[45] Nov. 20, 1979

[54] SUPPORT SYSTEM

[76] Inventor: Terry L. Nelson, 555 Bostwick Ave., P.O. Box 3036 Barnum Sta., Bridgeport, Conn. 06605

[21] Appl. No.: 885,151

[22] Filed: Mar. 10, 1978

[51] Int. Cl.² .............................................. F24J 3/02
[52] U.S. Cl. .................................................. 126/438
[58] Field of Search ............... 126/270, 271; 237/1 A; 248/139, 140, 371, 376, 377, 176, 177, 185, 49; 52/69; 108/6, 17, 150

[56] References Cited

U.S. PATENT DOCUMENTS

| | | | |
|---|---|---|---|
| 3,254,643 | 6/1966 | Thomason | 126/271 |
| 3,985,119 | 10/1976 | Oakes, Jr. | 126/271 |
| 4,059,226 | 11/1977 | Atkinson | 237/1 A |
| 4,108,019 | 8/1978 | Martin | 126/270 |

Primary Examiner—Carroll B. Dority, Jr.
Assistant Examiner—Lee E. Barrett
Attorney, Agent, or Firm—Thomas L. Tully

[57] ABSTRACT

A support structure, such as for use in supporting a solar panel-reflector panel system on a roof top, said structure having a generally V-shaped cross-section and comprising opposed wing members which are commonly supported by an elongate tubular member of rectangular cross-section which comprises the base of said V-shape. The wing members, comprising the arms of said V-shape, are adapted to be supported solely by said tubular member, each at an angle of from about 5° to about 85° above horizontal depending upon the end use requirements such as geographic location. For solar panel-reflector panel systems, preferably the support wing for the solar panels is mounted on the tubular member in fixed position at an angle of from about 50° to 70° above horizontal while the support wing for the reflector panels is hingedly mounted on the tubular member for adjustable positioning between a working angle of from about 10° to 30° above horizontal and a non-working or shield position in which the support wing for the reflector panels is pivoted past vertical position to a position in which it is parallel to and closely associated with the other wing supporting the solar panels to cover and protect the latter during periods of non-use.

12 Claims, 5 Drawing Figures

4,174,704

SUPPORT SYSTEM

BACKGROUND OF THE INVENTION

Solar heating systems are being introduced in substantial numbers as a means for reducing reliance upon the more conventional forms of energy and for purposes of conserving such energy and reducing the cost of heating homes and buildings and heating the water used therein.

Solar heating panels generally are enclosures for pipes or tubing containing circulating water, the enclosure comprising material which absorbs large amounts of infrared radiation from the sun and converts such radiation to heat which is conducted to the pipes, tubing and water to increase the temperature of the water. The heated water is circulated through the heating system of the home or building, i.e., through radiators, or is used for washing or other purposes requiring heated water.

Solar panels are most effective when they are positioned so as to face the sun and receive the sun's rays at an angle as close to perpendicular as possible during the longest period of the day and during the coldest part of the year. However, since the angle of the sun relative to the earth varies during each season and during each day, it is not possible to have a fully efficient solar panel system unless the solar panels are adjustably mounted for continuous movement to track the sun as its angle to the earth continuously changes. Such systems are expensive and energy-consuming to operate and are impractical where the heat requirements necessitate the use of numerous large solar panels, such as in the case of heating large office buildings.

As a compromise, it has been proposed to use solar panels in association with reflector panels which are mounted adjacent the solar panels and at an angle relative thereto, i.e., from about 90° to about 120°, so that as the angle of the sun relative to the face of the solar panels passes beyond perpendicular a portion of the sun's rays strikes the reflector panels and is reflected onto the solar panels. The amount of reflection increases as the amount of direct sunlight hitting the solar panels decreases, with maximum reflection occurring when the angle of the sun's rays is perpendicular to the face of the reflector panels.

While such solar panel-reflector panel systems provide good results with respect to efficiency, they have disadvantages. Most new office buildings are constructed with overall appearance being a highly important consideration. The conventional steel framework required to support a solar panel-reflector panel system on a roof is readily visible and detracts from the appearance of a modern structure, such as an office building, school, apartment building, factory, motel, shopping center, sports complex, or the like. Also, a conventional solar panel-reflector panel support system covers and obstructs the entire surface of roof on which it is supported so that the roof is not useful for other purposes during periods of non-use of the system and so that roof maintenance is obstructed. Finally, conventional solar panel-reflector panels support systems do not include any means for protecting or shielding the solar panels during periods of non-use, whereby the system continues to generate heat unless the water is drained therefrom, and the solar and reflector panels are needlessly exposed to the elements.

Reference is made to U.S. Pat. No. 4,020,827 relating to solar panel-reflector panel systems, and to the patents referred to therein, for their disclosure of conventional solar panels, reflector panels and heating systems.

SUMMARY OF THE INVENTION

The present invention relates to novel, substantially-concealed support systems adapted to support solar panels and reflector panels adjacent each other in a substantially V-configuration, the support system comprising an elongate tubular member mounted on edge and forming the apex or base of the V-configuration and attached to the building support system, and opposed wing members attached to said tubular member and extending outwardly and upwardly therefrom to form the arms of said V-configuration. One wing member is adapted to support one or more solar heat-collecting panels attached thereto in side-by-side relation while the opposed wing member is adapted to support one or more solar heat-reflector panels in side-by-side relation and at an angle to the solar panels in a V-configuration.

The support system wing members carrying the panels are adapted to be supported solely by said tubular member without the need for beams or other supports extending from the upper ends of the wing members to the roof. Thus, the support system is substantially concealed by the solar and reflector panels carried thereon, so that the system has the pleasant appearance of a free-standing, self-supporting or balanced structure which, nevertheless, has the strength to support heavy snowfall and to resist damage under the effects of high winds encountered on a roof top.

According to a preferred embodiment, the present support system comprises a solar panel support wing which is fixed to said tubular member and a reflector panel support wing which is fixed to said tubular member and a reflector panel support wing which is hingedly or pivotally attached to said tubular member for movement to any one of a number of desired working angles, relative to said solar panel support wing, and to a shield position in which it stands substantially adjacent and parallel to said panel support wing to shield the solar panels from the sun and to protect both types of panels from the elements during period of non-use.

DETAILED DESCRIPTION

Figure 1:
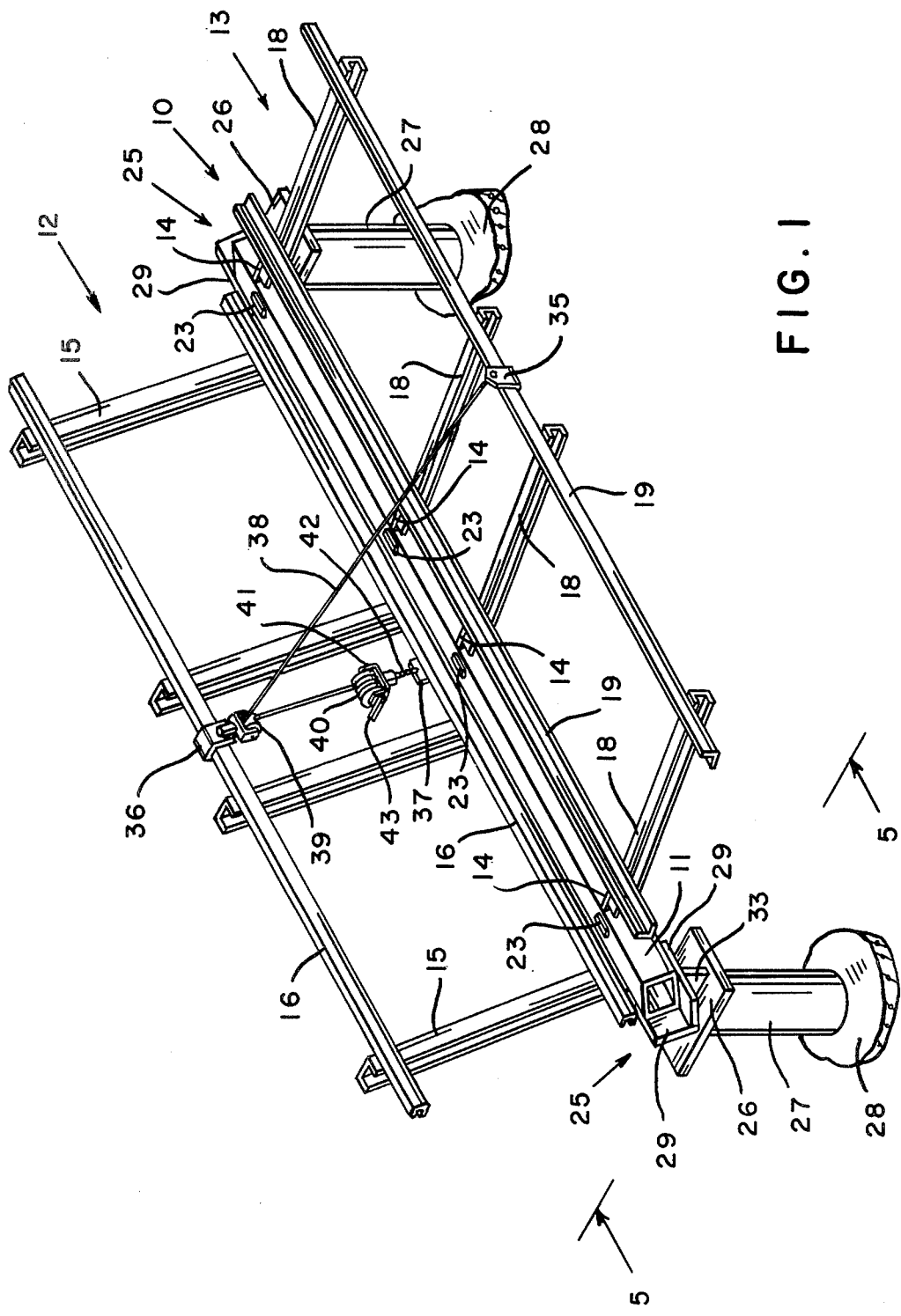
FIG. 1 is a perspective view of the support system of the present invention according to a preferred embodiment.
Figure 4:
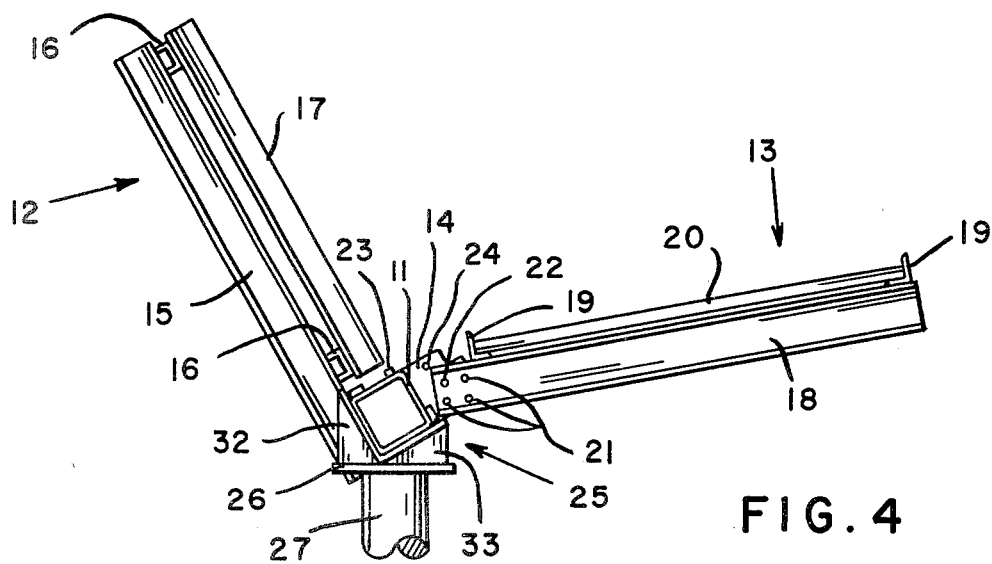
FIG. 4 is an end view of the panel support system of FIG. 1.
Figure 5:
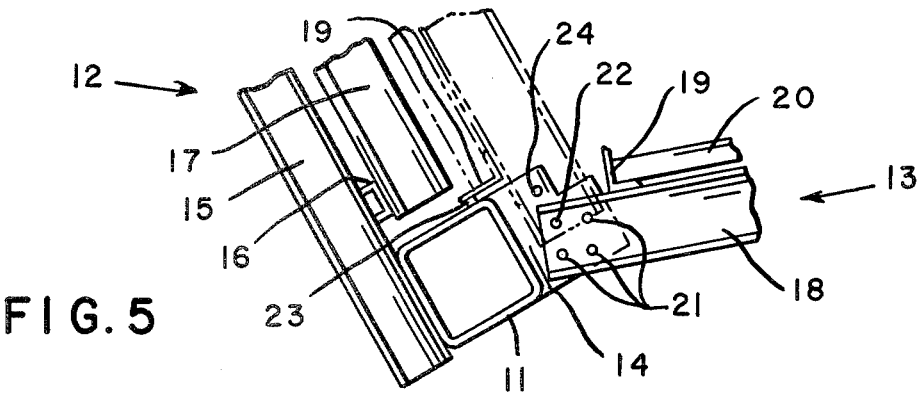
FIG. 5 is partial cross-section, to an enlarged scale, taken along the line 5—5 of FIG. 1, but also illustrating the solar panels and reflector panels in position and illustrating the reflector panel wing in shield position by means of broken lines.

The support structure 10 of the present invention, according to a preferred embodiment illustrated by FIG. 1 of the drawings, comprises an elongate, hollow, rectangular tube member 11 which is substantially one foot square in cross-section, which is mounted on edge and which has attached to one surface thereof adjacent said edge a fixed support wing 12, such as for solar panels, and has attached to a surface thereof opposite said one surface an adjustable support wing 13, such as for reflector panels, wing 13 being adjustably attached to spaced plates 14 which extend from and are fixed to the tube member 11 at a surface directly opposite the surface of tube member 11 to which the wing 12 is fixed, as most clearly illustrated by FIGS. 4 and 5.

Fixed wing 12, adapted to support six solar panels which are about six feet long and about four feet wide in close side-by-side positions, comprises four parallel upright beams 15 forming support ribs, each of which is about 7½ feet long and is fixed adjacent its lower end to the tube member 11, such as by being welded thereto, and two parallel cross braces 16 which are about twenty or twenty-five feet long and are spaced by about five and one-half feet. Each of the cross braces 16 is fixed to each of the upright beams 15, such as by welds, to form braces to which the solar panels 17 can be bolted or otherwise attached, as illustrated by FIGS. 4 and 5.

Adjustable support wing 13, adapted to support about six radiation-reflector panels which are about seven feet long and about four feet wide in close side-by-side positions, comprises four parallel upright beams 18 forming support ribs, each of which is about 7⅜ feet long and is adjustably attached adjacent its lower end to one of the spaced plates 14 fixed to tube member 11, as shown by FIGS. 4 and 5. Wing 13 also comprises two parallel cross braces 19 which are about 20 to 25 feet long, which are attached to upright beams 18 and which are adapted to have the reflector panels 20 bolted or otherwise attached thereto, as shown by FIGS. 4 and 5. The beams 18 of wing 13 are attached to spaced plates 14 of tubular member 11 by means of three bolts or threaded pins 21 and a pivot bolt or threaded pin 22 which pass through aligned holes in each beam 18 and adjacent plate 14 and which are secured therein such as by means of nuts.

When the reflector wing 13 is to be pivoted from working or open position to inactive or shield position, shown by means of broken lines in FIG. 5, the three bolts 21 are removed from each of the four beams 18 and plates 14 and the wing 13 is pivoted upwardly about pivot bolts 22, such as by means of a mechanical cable winch, as shown in FIG. 1, or by power-driven means, such as hydraulic lifts, electric motors, etc., until the undersurface of the lower cross-member 19 engages spaced stop members 23 which are attached to tubular member 11 adjacent each of the plate members 14. At this point, the wing 13 is in shield position, parallel to and closely spaced from solar panels 17 on fixed wing 12 and one of the holes in each of the beams 19 is in alignment with a fifth hole 24 present in each of the plates 14. Thus, one of the bolts is reinserted in each of the aligned holes to cooperate with the pivot bolts 22, which remain in place, to secure the wing 13 in shield position.

Obviously, other means may be used in place of the holes and bolts illustrated by the drawing in order to provide adjustable pivotal attachment between tubular member 11 and reflector wing 13, particularly in cases where it is desired to provide a reflector wing which is capable of manual or automatic adjustment to any one of a large number of angles, relative to the faces of the solar panels, to track the path of the sun and provide the most efficient reflection thereof onto the solar panels. For instance, beams 18 and plates 14 may be secured together by means of power-driven gears, rack and pinion or other means which may be automatically controlled by sun tracking means to continuously move the wing 13 and adjust the angle of reflection.

The present V-shaped support structure is given a free-standing or self-supporting appearance by means of the frictional attachment of the tubular member 11 within V-shaped saddle members 25 which are fixed to or integral with base plates 26 adjacent each end of the tubular member 11. The base plates 26 are attached to columns 27 which in turn are secured to or integral with the support columns of the building at or below the roof surface 28, thereby maintaining the structure at any desired distance above the roof surface 28. Preferably, the columns 27 are about two feet in height to provide ample room for snowfall and/or ease of maintenance.

The saddle members 25 comprise right angular, V-shaped saddle plates 29, the arms of which are longer than the sides of the square tubular member 11 so as to extend therebeyond and provide extensions 30 to which retainer bars 31 are secured, such as by welding, so as to tightly frictionally secure the tubular member 11 within the saddle plates 29. Such engagement permits expansion and contraction of the tubular member 11 with changes in temperature without placing any undue stress on the saddle members 25, base plates 26 or the support columns 27, and also restrains the elongate tubular member 11 against unseating.

The tubular member 11 is supported on edge in saddle 29 on base plates 26 by means of brace plates 32 and 33 which are attached to or integral with the base plates 26 and are attached to the saddles 29, such as by being welded thereto, to secure the saddle members 25 to the base plates 26 which, in turn, are secured to the columns 27.

Figures 2, 3:
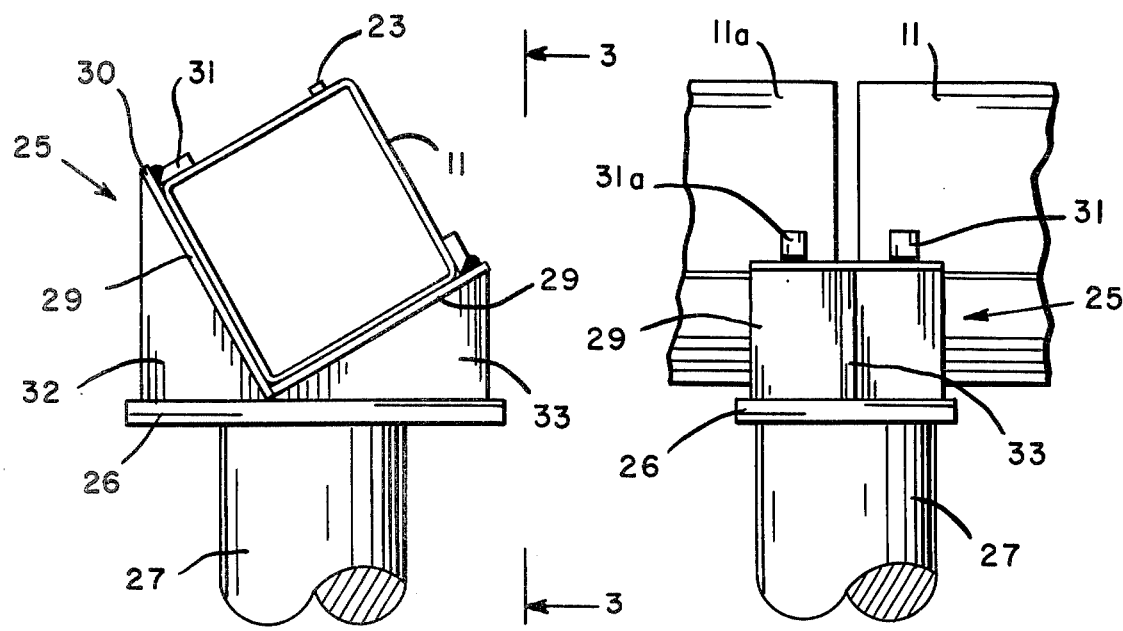
FIG. 2 is an enlarged sectional end view of the tubular member support of the system of FIG. 1.
FIG. 3 is a side view taken along the line 3—3 of FIG. 2, illustrating the co-support of two aligned solar panel-reflector panel support systems.

The support systems of the present invention are adapted to be used as aligned multiple units and as parallel rows of such multiple units, depending upon the size of the building and its heating requirements. Thus, as shown by FIG. 3 of the drawing, each saddle member 25 may support and frictionally engage two aligned tubular members 11 and 11a by means of spaced retainer bars 31 and 31a. Tubular member 11a is a component of a panel support system identical to that of tubular member 11 and has its own wing members. The base plates 26 and support columns 27 are shared by adjacent aligned panel support systems, as shown by FIG. 3.

The dimensions of the present support structures, such as the length and width of tubular member 11 and the length of upright beams 15 and 18 and the length of cross braces 16 and 19, may be varied depending upon the size of the unit required and the size and number of elements such as solar panels and reflector panels being supported. The essential requirement is that the wings 12 and 13 of the unit are attached to the tubular support member 11 while such member preferably is only frictionally engaged by spaced means, namely saddle members 25, which are attached to the building support system either directly or indirectly.

According to the embodiment illustrated by FIG. 1 of the drawing, the present support structure is conveniently provided with a detachable conventional mechanical cable winch 34 which can be attached to each support structure for purposes of mechanically moving the pivotal wing section 13 to a different angle, relative to the fixed wing section, or to closed or shield position, as illustrated by broken lines in FIG. 5. Thus, a single cable winch 34 can be used to adjust each support structure, sequentially, in a system which consists of a multiplicity of such support structures arranged in lines and/or in parallel rows. The cable winch 34 illustrated comprises a cable clamp 35, a pulley clamp 36 and a drum clamp 37, each designed to removably engage cross beam 19 and upper and lower cross beams 16, as shown. A wire cable 38 is attached to cable clamp 35, passes over pulley 39 attached to pulley clamp 36 and is taken up onto drum 40 which is attached to drum clamp 37 by means of a yoke 41 and a chain 42. The drum 40 is turned by means of a handle 43 to draw the cable 38 onto the drum 40 and thereby pull the pivotal wing section 13 towards the fixed wing section 12 and to any desired position, the pins 21 having been removed to permit adjustment and being reinserted to lock the wing section 13 in its new position. Wing section 13 can be moved to its open position by reversing the process to expend cable 38 from drum 40, the weight of wing section 13 causing wing section 13 to open as much as permitted until the pins 21 are reinserted to lock wing section 13 in any desired open position.

The elongate tubular member is designed to support the weight of the wing members and the weight of elements attached thereto, such as solar panels and reflector panels, against the effects of high wind and heavy snowfall, due in part to the offsetting or balancing effects of the wing members being attached to and placing stress upon opposite sides or faces of the rectangular tubular member, as well as being due to the overall strength of said tubular member. The tubular member preferably is square in cross-section and is formed of steel having a thickness of at least about ¼ inch and up to about ½ inch or more, depending upon the size of the wing members and the load requirements.

The free-standing, self-supporting design illustrated by the figures of the drawing represents a preferred embodiment from the standpoint of appearance, ease of maintenance, operation, manufacture and shipping, and minimum obstruction of roof surface adjacent thereto. However, in cases where these requirements are unimportant, it should be understood that the structure may be attached to and supported by a number of transverse dunnage beams which are attached to a large number of support columns connected to the roof, and that additional support members such as upright beams may be used to attach the uppermost ends of the wing members to the dunnage beams, to the roof or to support columns integral with the building structure. Such additional support is unnecessary but the use thereof is not outside the scope of the present invention.

Variations and modifications may be made within the scope of the appended claims as will be apparent to those skilled in the art in the light of the present disclosure.

I claim:

1. A support structure adapted to support opposed elements at an angle relative to horizontal and facing each other in a cooperative relationship, said structure having a generally V-shaped cross-section and comprising opposed wing members which form the arms of said V-shape and which are commonly attached to an elongate tubular member of rectangular cross-section which comprises the apex of said V-shape, said tubular member being supported on edge so that the sides of said rectangular cross-section adjacent said edge extend upwardly at angles relative to horizontal, one of said sides having attached thereto, along the length of said tubular member, a multiplicity of spaced beams which extend upwardly and outwardly of said tubular member to form support ribs for one of said wing members comprising an arm of said V-shape, a second side of said tubular member opposite said one side having attached thereto, along the length of said tubular member, a multiplicity of spaced beams which extend upwardly and outwardly of said tubular member to form support ribs for the other of said wing members comprising the other arm of said V-shape, whereby the weight of said wing members and of elements attached thereto is adapted to be supported solely by said tubular member.

2. A support structure according to claim 1 further comprising spaced V-shaped saddle means which are adapted to be secured to a building structure and which receive and secure said elongate tubular member, adjacent the ends thereof, and support said member on edge.

3. A support structure according to claim 2 in which said tubular member is frictionally engaged within said saddle means to permit expansion and contraction of said tubular member while restraining unseating of said member from said saddle means.

4. A support structure according to claim 2 in which at least some of said saddle means receive and secure the ends of two said elongate tubular members in aligned relationship to provide a system comprising a multiplicity of aligned support structures as defined in claim 1.

5. A support structure according to claim 1 in which said other wing member is adjustably attached to said elongate tubular member to permit pivotal movement of said wing member relative to said tubular member, whereby said adjustable wing member may be pivoted between two or more angles relative to horizontal and secured to provide a structure in which the angle of said other wing member is variable relative to the angle of said one wing member.

6. A support structure according to claim 5 in which said other wing member is pivotal to a position in which it is substantially parallel to said one wing member whereby any elements supported by said wing members are brought close together.

7. A support structure according to claim 6 in which the elongate tubular member is provided with spaced stop means which engage and support said other wing member when said member is pivoted to said parallel position.

8. A support structure according to claim 4 which comprises spaced hanger means which are attached to and extend outwardly from said second side of said tubular member and which pivotally engage the support ribs of said other wing member to provide said adjustable attachment.

9. A support structure according to claim 8 in which said hanger means comprise plates provided with a multiplicity of spaced holes corresponding in size and location to a multiplicity of spaced holes present adjacent the lower end of said support ribs, one hole in each plate being aligned with one hole in each support rib and a pin being present in both said holes to provide a pivot point between each said plate and each said support rib, and at least one other hole in each said plate being aligned with at least one other hole in each said support rib and having a pin present within said holes to lock said adjustable wing section in any one of a multiplicity of different positions.

10. A support structure according to claim 1 in which each of said wing members comprises said multiplicity of spaced beams, forming support ribs, and at least two spaced cross beams which are attached to each of said support ribs and which comprise means for attachment to elements adapted to be supported by said wing members.

11. A support structure according to claim 10 in which the spaced cross beams on the one wing member have attached thereto at least one solar heat-collecting panel and the spaced cross beams on the other wing member have attached thereto at least one solar radiation-reflecting panel which is adapted to reflect solar radiation onto said solar heat-collecting panel during use.

12. A support structure according to claim 11 in which said other wing member is pivotally attached to the elongate tubular member and is adjustable to a multiplicity of pivoted positions providing a multiplicity of different angles of said solar radiation-reflecting panel relative to said solar heat-collecting panel.

* * * * *